(12) United States Patent
Baker

(10) Patent No.: US 7,269,177 B2
(45) Date of Patent: Sep. 11, 2007

(54) LOGICAL STAR TOPOLOGIES FOR NON-STAR NETWORKS

(75) Inventor: Albert D. Baker, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1051 days.

(21) Appl. No.: 10/298,704

(22) Filed: Nov. 18, 2002

(65) Prior Publication Data

US 2004/0095946 A1    May 20, 2004

(51) Int. Cl.
*H04L 12/28*    (2006.01)
*H04L 12/56*    (2006.01)
(52) U.S. Cl. .................................. 370/403; 370/425
(58) Field of Classification Search ............. None
See application file for complete search history.

(56) References Cited

U.S. PATENT DOCUMENTS

2002/0167899 A1 * 11/2002 Thompson et al. ......... 370/222
2004/0213564 A1 * 10/2004 Sakano et al. ............. 398/12

* cited by examiner

*Primary Examiner*—Chi Pham
*Assistant Examiner*—Ronald Abelson

(57) ABSTRACT

A logical star architecture imposed on an underlying non-star network, for example a Virtual Path Ring (VPR), enhances a mesh protocol with an automatic method for Virtual Path ID (VPI) generation. The VPIs are used by the mesh protocol's inherent routing function to effect automatic configuration at installation, automatic reconfiguration at node updates, and automatic reconfiguration for protection switching. The imposition of the logical star architecture on a VPR reduces node-to-node switching costs (e.g., delay, as well as memory and processing costs) since all nodes in a logical star topology are at most two logical hops away. The logical star also conserves virtual path address space relative to a fully configured ring. Additionally, the imposition of the logical star architecture allows existing star functions to be deployed on the underlying network. Finally, when the underlying architecture is a ring, the protection advantages of ring networks can be preserved.

20 Claims, 9 Drawing Sheets

Partial Mesh

Logical Ring

LOGICAL STAR TOPOLOGIES FOR NON-STAR NETWORKS

BACKGROUND OF THE INVENTION

1. Field of the Invention

The invention relates to routing signals through communication networks.

2. Description of the Related Art

A star network is a network of nodes having a topology in which one of the nodes (called "the central node") is directly connected to every other node in the network, while each of those other nodes is directly connected only to the central node.

One advantage of star networks is that traffic can be transmitted between any two nodes in the network with at most two "hops," where a hop is defined as transmission between two directly connected nodes. For every hop in a connection, the node at the beginning of the hop performs a certain amount of signal processing to route the signal towards the node at the end of the hop. The greater the number of hops in a connection, the greater the total amount of such processing overhead for the connection. From the perspective of minimizing processing overhead and associated communication latency, the fewer hops in a connection, the better. From this perspective, star networks are attractive because each connection in the network has only one hop or two hops maximum.

One of the disadvantages of star networks is that the central node is involved in all network traffic. In particular, for each star network connection, the central node is either a terminal node (i.e., the start node or the end node for the connection) or an intermediate node (i.e., a pass-through node for a connection between two non-central nodes). As a result, as the number of connections in a star network increases, traffic bottlenecks are more and more likely to occur at the central node.

Another disadvantage of star networks is that the central node corresponds to a potential single point of failure for the entire network. If the central node fails, then all communication in the network will cease.

A star topology is useful for applications in which most or all traffic is to and/or from a single node. In such applications, that node is configured to be the central node in the star network. On the other hand, a star topology is not generally suitable for the backbone of a service provider network, because it creates both a bottleneck and a single point of failure.

To avoid the disadvantages of star networks associated with traffic bottlenecks and single points of failure, networks, such as service provider networks, may be configured with non-star topologies such as a ring topology. In a ring network, every node in the network is directly connected to exactly two other nodes. Ring networks are less susceptible to traffic bottlenecks than star networks because there is no single node in a ring network that is involved in all possible network traffic. Ring networks also avoid the single point of failure problems associated with star networks. In particular, if any particular node or physical link fails in a ring network, then, in accordance with a typical ring-based protection scheme, any traffic associated with that failed node or link may simply be routed around the ring in the other direction (assuming that sufficient bandwidth is available).

On the other hand, one of the disadvantages of ring networks as compared to star networks is that the minimum distance between two nodes on diametrically opposing sides of an n-node ring network is n/2 hops. As such, as the number of nodes in a ring network increases, the average amount of processing overhead per network connection also increases.

It should be noted that the previous discussion focuses on ideal topologies and ideal advantages and disadvantages thereof. In practice, not all ring nodes are equivalent, nor are all of the spoke nodes of a star equivalent. For example, in some situations, one or more ring nodes in a ring or hub or spoke nodes in a star may typically be connected to one or more network feeders, potentially in a sparing arrangement. A feeder-connected node is typically equipped with additional redundant hardware for improved robustness to failure.

SUMMARY OF THE INVENTION

The problems in the prior art are addressed in accordance with the principles of the invention by overlaying a logical star topology on a non-star network, such as a ring network, such that signals are transmitted through the underlying non-star network in accordance with the overlaid logical star topology. In an overlaid logical star topology, each "logical hop" between two nodes in the logical star topology involves two or more nodes in the underlying non-star network, i.e., the node at the beginning of the logical hop, the node at the end of the logical hop, and zero, one, or more intermediate nodes. In such a logical hop, the processing needed to be performed by an intermediate node to route the signal to the next node in the logical hop is less than the amount of processing performed by the node at the beginning of a hop. As a result, the amount of processing overhead associated with a logical hop $\{N_1, N_n\}$ involving a sequence of nodes, $N_1, N_2, \ldots, N_n$ where n is greater than two, is less than the amount of processing overhead associated with the two or more hops (i.e., $\{N_1, N_2\}, \ldots, \{N_{n-1}, N_n\}$) that would otherwise be involved in transmitting a signal from node $N_1$ to node $N_n$ in the underlying non-star network.

On the other hand, because the underlying physical network has a non-star topology, networks of the invention have fewer problems associated with traffic bottlenecks and single points of failure than physical star networks. In the case where the underlying network is a protected ring, for example, the resulting overlaid star network benefits from the robustness of the underlying ring while retaining the routing simplicity of a star.

In one embodiment, the invention is a method for routing signals in a non-star network having a plurality of nodes connected in a non-star topology. The method involves overlaying a logical star topology on the non-star network and routing the signals in the non-star network according to the logical star topology.

In another embodiment, the invention is a non-star network having a plurality of nodes connected in a non-star topology, wherein the non-star network is adapted to route signals in the network according to a logical star topology that is overlaid on the non-star network.

In another embodiment, the invention is a method for automatically assigning network resources to a collection of elements in a network. The method includes detecting the topology of connected elements in the network, partitioning resources of the network, allocating the network resources, and assigning the network resources to the network elements.

BRIEF DESCRIPTION OF THE DRAWINGS

Other aspects, features, and advantages of the invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

According to embodiments of the invention, a logical star topology is overlaid on an underlying non-star network, such as a ring network. Depending on the particular implementation, the underlying ring topology may correspond to the topology of the actual physical network or it may itself correspond to a logical ring topology overlaid on a further underlying non-ring (and non-star) network. In theory, the invention may involve the sequential overlaying of one or more logical topologies on top of the ultimate, actual physical network.

Physical Ring with Logical Star Overlay

Figure 1:
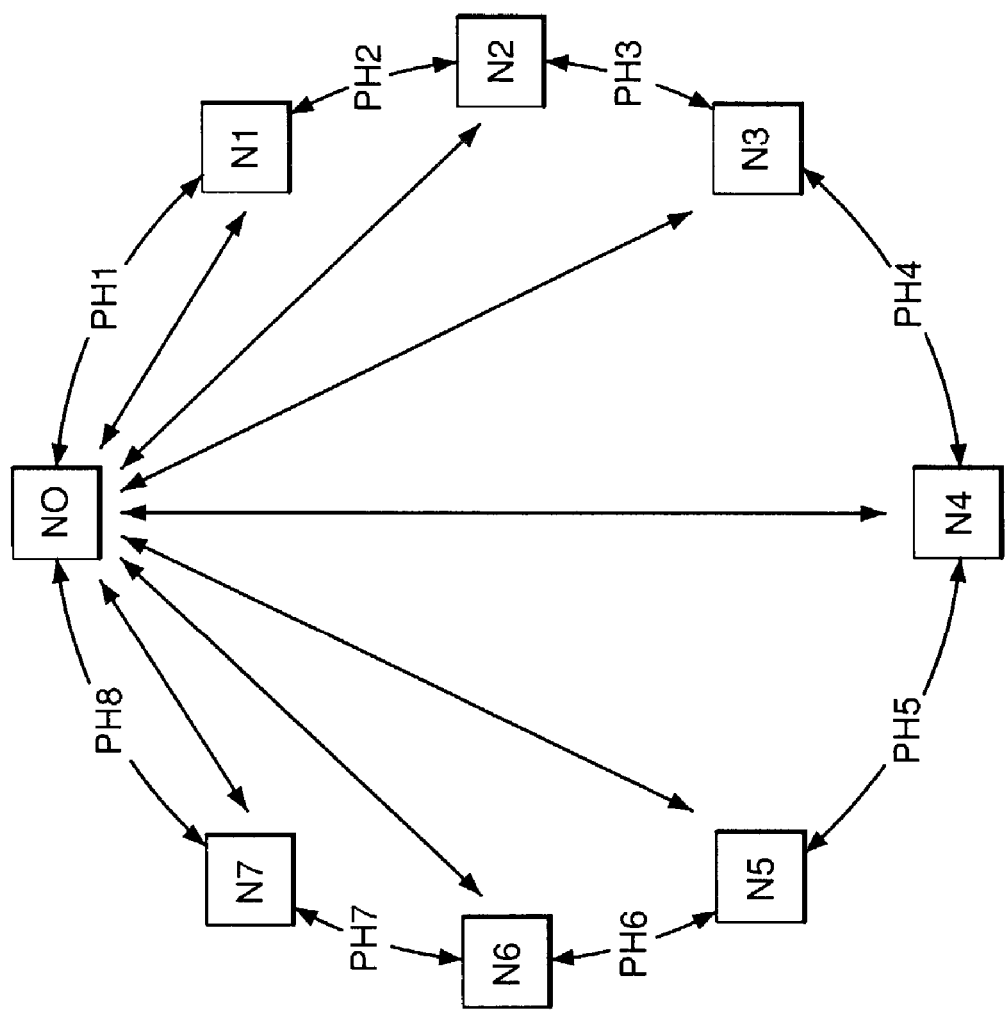
FIG. 1 depicts an exemplary bidirectional ring network overlaid with a logical star topology according to one embodiment of this invention.

FIG. 1 illustrates a bidirectional physical communications ring where N0 through N7 represent routing and switching nodes, PH1 through PH8 represent bidirectional physical links between nodes, and VP1 through VP7 represent bidirectional virtual paths associated with a logical star topology overlaid on the physical ring according to one embodiment of this invention.

Here PH1 links N0 to N1, PH2 links N1 to N2, PH3 links N2 to N3, PH4 links N3 to N4, PH4 links N4 to N5, PH5 links N5 to N6, PH6 links N6 to N7, PH7 links and PH8 links N7 to N0. The physical links between the nodes result in a physical ring topology. The virtual paths, however, represent a logical star topology overlaid on the physical ring, where node N0 is the central node of the logical star topology. In particular, VP1 links N0 to N1, VP2 links N0 to N2, VP3 links N0 to N3, VP4 links N0 to N4, VP5 links N0 to N5, VP6 links N0 to N6, and VP7 links N0 to N7. As used in this specification, the terms "virtual" and "logical" are used interchangeably.

One metric associated with cost of communication from one node in a communication network to any other node in that network is the number of hops a signal must pass through on its way from a communication source to its destination. In the exemplary ring network of FIG. 1, the minimum number of hops between diametrically opposed nodes (e.g., N2 and N6) is four, and the average number of hops between all nodes is 16/7 or about 2.29. Meanwhile, in the logical star topology of FIG. 1, the maximum number of logical hops from any node to any other node is two, and the average number of logical hops between all nodes is 7/4 or 1.75.

Take, for example, communication from node N2 to node N6 in the network of FIG. 1. Absent the invention, communication from N2 to N6 would involve a minimum of four hops, e.g., a first hop from N2 to N3 via physical path PH3, a second hop from N3 to N4 via physical path PH4, a third hop from N4 to N5 via physical path PH5, and a fourth hop from N5 to N6 via physical path PH6.

With the overlaid logical star topology of the invention, however, the number of logical hops from N2 to N6 is two, i.e., a first logical hop from N2 to N0 via virtual path VP2 and a second logical hop from N0 to N6 via VP6. In reality, the first logical hop involves communication from N2 to N0 via intermediate node N1, while the second logical hop involves communication from node N0 to N6 via intermediate node N7. Although the total number of physical hops in the two topologies is the same (i.e., four), the total amount of overhead processing for the two communications is different. In particular, the communication absent the invention involves "full-overhead" processing at nodes N2, N3, N4, and N5, while the communication in the overlaid logical star topology of the invention involves full-overhead processing at nodes N2 and N0 (i.e., the start nodes of the two logical hops), but only "reduced-overhead" processing at nodes N1 and N7 (i.e., the intermediate nodes of the two logical hops). As a result, the total overhead processing for the communication of the invention is less than that for the communication absent the invention.

As the number of nodes in the underlying ring network increases, the advantages of the logical star overlay become even more significant. In general, in an n-node ring, the maximum and average numbers of physical hops between nodes in the ring are $n/2$ and $n^2/4(n-1)$, respectively. Meanwhile, the maximum and average numbers of logical hops in an n-node logical star overlay are two and $2(n-1)/n$, respectively. Note that, as n increases, the average number of hops in the underlying ring network approaches a limit of $n/4$, while the average number of logical hops in the overlaid star topology approaches a limit of two.

Multi-Access Technology

Fiber-optic rings were historically constructed with Synchronous Optical NETwork (SONET) and/or Synchronous Data Hierarchy (SDH) terminals and Add/Drop Multiplexers (ADMs). The forward and protection paths were typically implemented with separate fibers or separate wavelengths on the same fiber. These systems suffered from wasted bandwidth associated with the limitations of the fixed Time Division Multiplex (TDM) access methodology of SONET. Recently, multi-access platforms have been developed using Asynchronous Transfer Mode (ATM) over SONET to overcome some of the bandwidth utilization problems associated with SONET-only solutions.

A common multi-access technology is known as ATM Virtual Path Ring (VPR). ATM VPR uses ATM cell multiplexing instead of TDM in order to gain the benefits of statistical multiplexing for transport of data traffic on a fiber ring. An ATM switch can use ATM cell mappings to SONET frames to make use of an existing physical SONET ring infrastructure. ATM VP rings are ring configurations with a SONET physical layer that may either carry ATM traffic exclusively or a combination of ATM and Synchronous Transfer Mode (STM) traffic. The former configurations are supported by pure ATM Add/Drop Multiplexers (ADMs) and the latter by hybrid ADMs. GR-2837-CORE, Issue 5, "ATM Virtual Path Ring Functionality in SONET—Generic Criteria" (incorporated herein by reference in its entirety) provides generic functional criteria for incorporating ATM VPR functionality into SONET rings. It introduces a modified terminology for SONET, ATM, and hybrid SONET/ATM entities and provides a general SONET ATM ring evolution overview. It further introduces functional models, discusses potential applications and operations functionality, and presents a set of ATM VP level requirements for SONET ATM VP ADMs.

Another relevant multi-access technology is Dynamic Packet Transport (DPT). DPT enables IP packets to be carried directly over the ring. The IP packets are carried in SONET frames. The entire capacity of the ring is treated as a single bandwidth pool for the purposes of statistically multiplexing IP packets. If a ring failure occurs, then the ring will wrap and a priority mechanism and a fairness algorithm will determine the allocation of available bandwidth among devices.

Both of these technologies can be implemented incrementally on an existing SONET ring network by dedicating some of the SONET TDM bandwidth to the new technology. They can also be implemented directly on a DWDM network by using SONET framing and at the same time avoiding the expense of SONET multiplexers. Both of these technologies can also support the overlay of a logical star topology per the invention.

ATM Adaptation

As discussed earlier, for many telecommunications carriers today, it is common to use an Asynchronous Transfer Mode (ATM) adaptation layer on top of a SONET ring. One key advantage of this approach is efficient support for multiple protocols in spite of the rigid underlying SONET TDM infrastructure. One well-known adaptation mechanism for mapping ATM over a SONET ring is the Virtual Path Ring (VPR).

In setting up a VPR, the relationship between the ring nodes and their virtual paths is administered at installation time. This is a costly and error-prone operation. Further, if the ring is altered, then the administration must be redone, with the additional complexity that the new nodes and path assignments do not interfere with previously administered characteristics.

Additionally, node-to-node signaling is challenging. If node-to-node paths are administered, at least one unique virtual path (VP) must be assigned from every node in the ring to every other node in the ring. In an n-node network, the number of VPs required is $(n^2-n)/2$. Managing this number of VPs can put a burden on system management and administration resources. Further, if the protection capability of the underlying ring is to be maintained, then the reverse direction paths must also be provisioned. Provisioning errors may result in incorrect operation of the network and may remain hidden until a path switch occurs. If the node-to-node paths are not administered, then, to reach a node on the opposite side of the ring in a Switched Virtual Circuit (SVC) environment, signaling procedures must be executed on each and every intervening node. This causes an incremental delay per node that can cumulatively become unacceptably large on large rings, and which is exacerbated on busy rings.

In the case where the underlying network is an Asynchronous Transfer Mode (ATM) Virtual Path Ring (VPR) routed according the Private Network-Network Interface (PNNI), a special Ring Administration task is assigned to the peer group leader (PGL). This Ring Administration task assigns virtual path IDs (VPIs) to effect a star overlay on the VPR at installation and to reconfigure the star overlay automatically at node additions, deletions, or link failures. Imposition or overlay of the logical star architecture on the VPR reduces node-to-node switching costs (e.g., delay, as well as memory and processing costs) since all nodes in a star topology are at most two logical hops away. The logical star also conserves virtual path address space relative to a fully configured VPR. Finally, since the underlying network is a VPR, the robustness associated with protection switching is preserved.

Virtual Path Ring

A VPR represents one very practical example of a ring abstraction of an underlying network upon which this invention can be implemented. One embodiment of the invention manipulates the PNNI routing and signaling protocols on an (ATM) Virtual Path Ring (VPR) to effect the creation of the logical star while maintaining compatibility with those protocols. Some implementation details in this context follow.

PNNI specifies a logical hierarchy of (partial or full mesh) networks for the purpose of generalized routing. PNNI includes a concept called "peer group leader election" (PGLE) whereby one of the logical nodes within a peer group of nodes is designated the "peer group leader" (PGL). The PGL has certain responsibilities with respect to routing and communication of (in some cases, summarized) topology information to other nodes within its peer group and to other nodes above and below it in the peer group hierarchy. These responsibilities afford the PGL certain privileges with respect to topology and routing control. It is these privileges that are exploited in this implementation of the invention to impose a star topology upon the VPR.

A PGL is elected by virtue of his relative "leadership priority" within its peer group. The leadership priority is a parameter configured by the system administrator or derived by the invention according to knowledge of the system topology. It is thus possible to "rig" the PGLE. Per this invention, a "head" node is designated that will execute a set of special "star overlay" procedures. Thus, one step in the implementation of the star overlay of this invention on a VPR is to rig the PGLE such that the designated "head" node of the star overlay is the one that gets elected PGL. The PGL (and thus the head node of the overlaid star network) is also a "border" node according to PNNI terminology, which equates to it being an ATM feeder node in the context of ATM VPRs. Note that, in one implementation of this invention, the a priori knowledge of the peer group leader allows vendors to associate additional resources with the PGL (e.g., processing power, redundant hardware for protection, and memory) to better help the PGL/head node accomplish its assigned tasks. In preferred implementations, the head node will also be the central node in the logical star topology, although that is not necessary.

As per the PNNI reference specification, when a communications link becomes operational within a PNNI network, neighboring nodes exchange identification information over the PNNI Routing Control Channel (RCC), which has the well-known Virtual Path ID and Virtual Circuit ID (VPI, VCI) address (0, 18). This is accomplished using the PNNI Hello protocol over these links whereby the nodes exchange their topology state information using PNNI Topology State Elements (PTSE) that are flooded throughout the peer group. It is by this method that the members of the peer group become aware of the details of group memberships and synchronize their topology databases.

Figure 2:
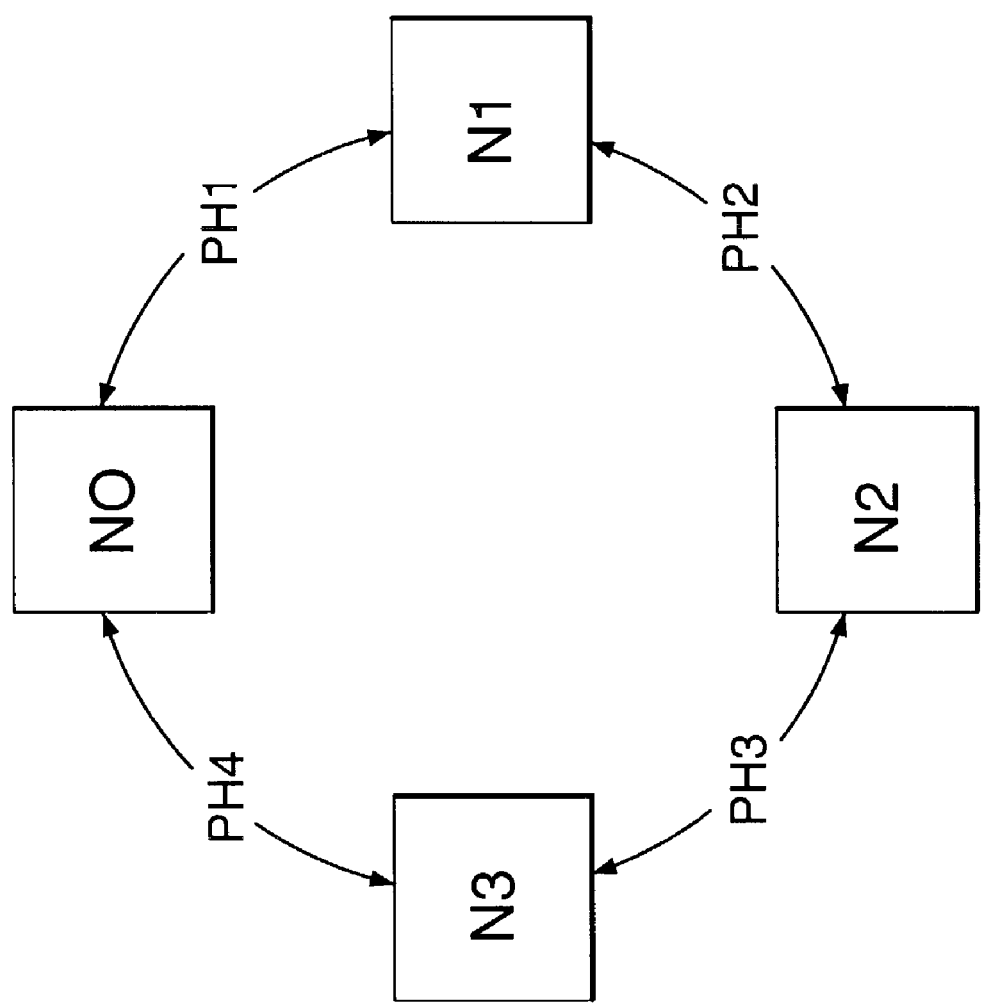
FIG. 2 depicts another exemplary ring network.

Referring to FIG. 2, assume N0 is configured to be the head node and is also configured to have the highest leadership priority. When the system links become active, each adjacent node executes a "Hello" exchange with its neighbor, and, executing normative PNNI procedures, develops PTSE and floods those around the ring.

For example, N0 exchanges Hellos with N1 via path PH1, N1 exchanges Hellos with N2 via path PH2, N2 exchanges Hellos with N3 via path PH3, and N3 exchanges Hellos with N0 via path PH4. Via these neighbor-to-neighbor exchanges, the latest topology information is flooded within this peer group.

Note that the head node N0 has been configured to have the highest leadership priority. Thus, it easily wins the PGLE, and it is also aware of the fact that it is both the PGL and the head node with respect to the logical star topology overlay of this invention. As such, it knows that it must execute a set of special "star overlay" procedures including "Administer Ring" as outlined in FIG. 3.

Figure 3:
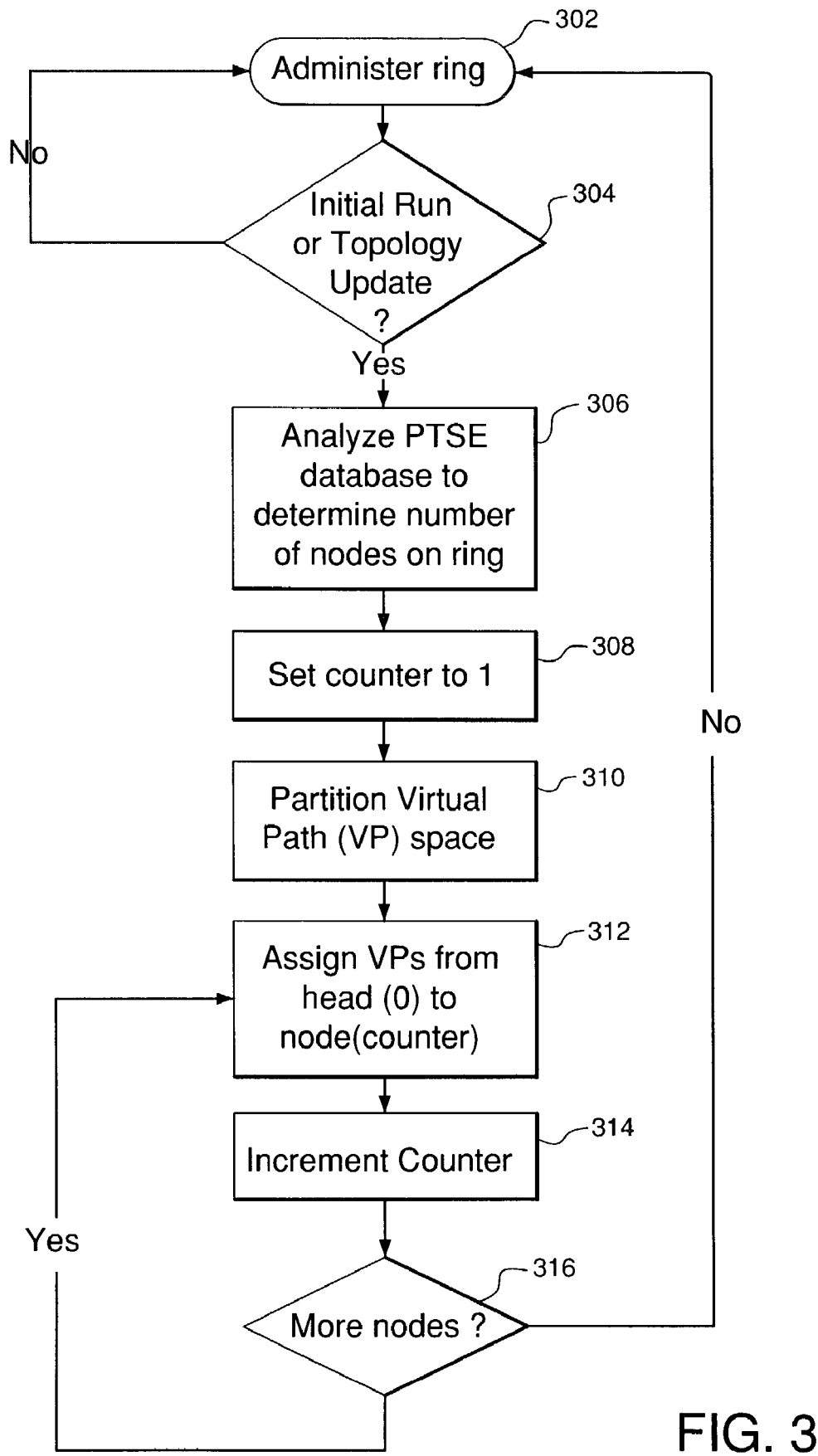
FIG. 3 depicts a procedure for virtual path assignment according to one embodiment of this invention.

As illustrated by FIG. 3, when the head node executes the Administer Ring routine, at step 304 it checks to see whether this is the initial run of the routine or whether a topology update has occurred. A topology state change could be triggered by a change in the PTSE database resulting from an addition or subtraction of a node from the ring, a node failure, a change in traffic patterns, or other occurrences outlined in the PNNI specification. These would be detected by the head node via PNNI topology update messages.

If this is the first time the routine has been run, then control flows to step 306. In step 306, the PTSE database is analyzed to determine the number of nodes currently on the ring. In step 308, a counter is initialized to "1" corresponding to the index to the first node (e.g., per PTSE analysis) on the network beyond the head node. In step 310, the VP address space is partitioned by the number of nodes, optionally leaving a scatter of VP addresses in reserve for topology changes and growth as per the mechanism detailed in U.S. patent application Ser. No. 09/861,947, filed May 21, 2001 as attorney docket no. Baker 24-2 ("the '947 application"), incorporated herein by reference in its entirety. In step 312, for the node on the ring corresponding to the value of the counter, a VP, or set of VPs, is assigned between the head node and that node. This assignment can be accomplished using the Interim Link Management Interface (ILMI) via the management (VPI,VCI) address (0, 16), where the node address information contained in the PTSEs forms the basis for configuring the VP assignments. In step 314, the counter is incremented by one and, in step 316, a test is done to see whether the counter exceeds the number of nodes in the network (i.e., whether each of the nodes has been assigned a set of VP addresses). If there is another node, then processing returns to step 312. If all the nodes have been assigned VP addresses, then control returns to the start of the Administer Ring routine at step 302.

Figure 4:
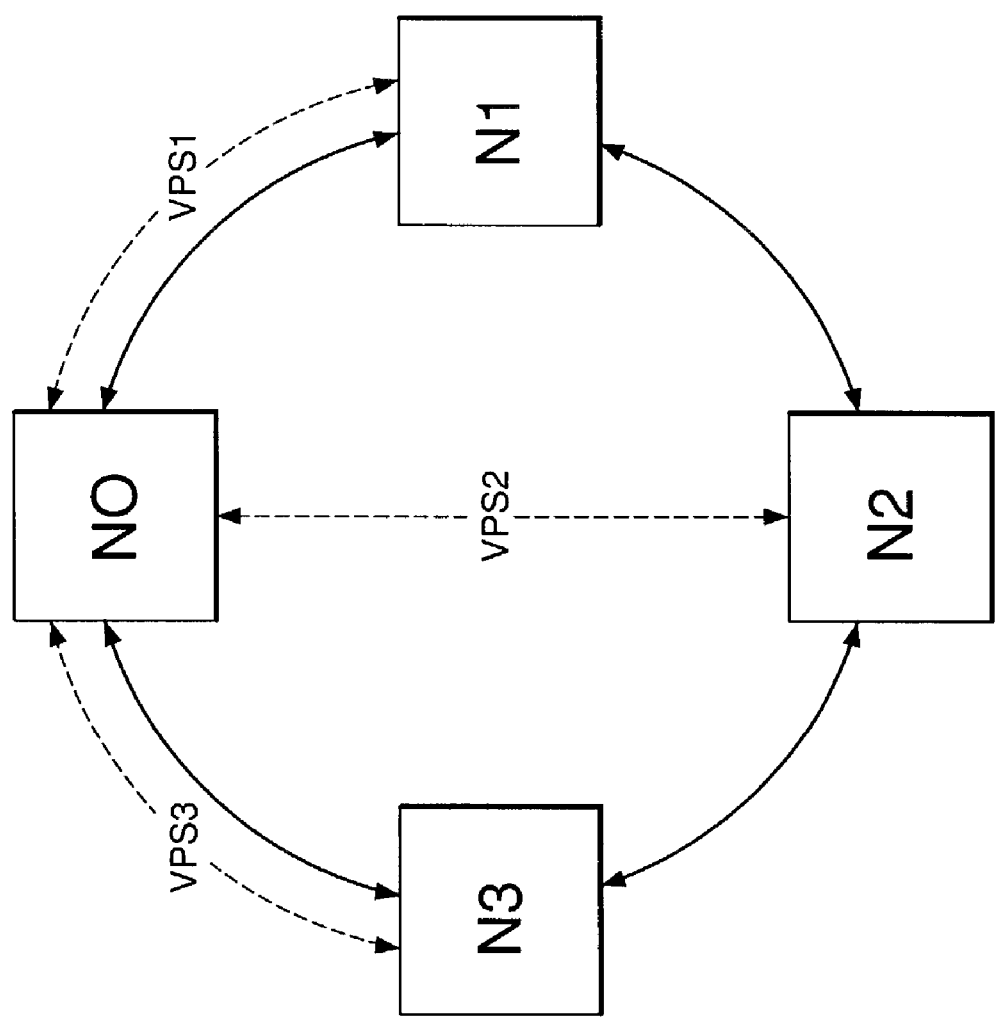
FIG. 4 depicts a logical star topology overlaid on the ring network of FIG. 2 according to one embodiment of this invention.

The result of the Administer Ring routine is the assignment of one or more virtual paths from the head node to each of the other nodes in the ring. This logical architecture equates to a star topology that is overlaid on the underlying ring network, as depicted in FIG. 4, where VPG1, VPG2, and VPG3 represent sets of virtual path addresses where each of VPG1, VPG2 and VPG3 represent a set of one or more virtual paths assigned between the head node and another node in the network. The dotted lines in FIG. 4 represent virtual paths, while the solid lines represent the communication links of the underlying ring network.

The following illustrates the application of the Administer Ring routine of FIG. 3 to the ring network of FIG. 2. As discussed, as the nodes are powered up, they would load and run the procedures associated with SONET, ATM, VPR, and PNNI protocols at the appropriate points in their initialization and configuration along with SNMP and ILMI procedures as is conventional for networks of this type. Thus, at the PNNI level, the Hello protocol would be executed, PTSE would be exchanged by the nodes, and knowledge of the addresses and interconnection topology of the ring would be established throughout the ring. According to this invention, assuming N0 is the network feeder, it would have been a priori configured with an initial leadership priority above that of the other nodes N1, N2, and N3 in the ring. It would thus be elected PGL through the normal PNNI PGLE and then load and run the Administer Ring routine of this invention.

Per FIG. 3, at step 304, the routine would detect that this is the initial run of the procedure and control would jump to step 306. In step 306, the PTSE database is analyzed to determine the number of nodes currently on the ring. In step 308, a counter is initialized to "1" corresponding to the index in an ATM address array corresponding to the first node on the network downstream from the head node (e.g., N1). In step 310, the VP address space is partitioned by the number of nodes other than the head node (i.e., three), which resulted from the analysis of step 306. In this example, we will assume that 4 bits define the VP address space, resulting in a virtual address space of 16 unique addresses. Thus in step 310, the virtual address space of 16 addresses is divide by 3 yielding 5 addresses per virtual path "set," with one left over. It is typical to reserve some of these addresses for future incremental expansion and modification, so in this example, 4 of the 16 will be set aside as reserve, leaving 12 addresses for assignment to the virtual paths that define the star topology (e.g., 4 addresses per virtual path set). In step 312, corresponding to the value "1" of the counter, the logical route between node N0 and node N1 on the ring is assigned VPs 1, 2, 3, and 4. In other words, the set of virtual paths between node N0 and node N1 is defined to be virtual path set 1 (VPS1) where VPS1={VP1, VP2, VP3, VP4}), while VP 5 is held in reserve. The virtual paths defined by VPS1 are then assigned (e.g., via ILMI). In step 314, the counter is incremented by one and, in step 316, a test is done to see whether the counter exceeds the number of nodes in the network (i.e., whether the route from the head node to each of the other nodes in the ring has been assigned a set of VP addresses). In particular, the counter is incremented to 2 in step 314, and control returns to step 312 where the set of virtual paths from node N0 to node N21 is defined to be VPS2={VP5, VP7, VP8, VP9}. These paths are then assigned (again via ILMI or equivalent administration protocol), while VP 10 is held in reserve. Similarly, VPS3 get defined as {VP11, VP12, VP13, VP14} and assigned between N0 and N3, and VP 15 and VP 16 are held in reserve. The reserve set is thus VPR={VP5, VP10, VP15, VP16}. Once all the routes have been assigned VP addresses, then control returns to the start of the Administer Ring routine at step 302.

Reconfiguration

To understand how the invention operates when modifications are made to the underlying network, assume that an additional node NA is inserted between node N0 and node N1 in the ring of FIG. 2. Via the Hello protocol, this node would advertise its existence and connections. The flooding mechanism would eventually cause this new addition to be communicated to the PGL (i.e., head node N0) where the Administer Ring routine would detect a topology update. In this case, the Administer Routine could be executed as shown and all nodes reassigned new VP addresses, or a special "minor topology change" subroutine (not illustrated) could be run that assigns some of the reserve addresses (from the initial run) to this new path (e.g., VP addresses 5 and 15 could be assigned to the path from N0 to NA while VP addresses 10 and 16 are still held in reserve).

Note that the VP assignments are arbitrary in this example. Many alternative methods can be used for how VPs are assigned as well as how VPs are held in reserve. In the example above, VPS1 could have been defined as {VP1, VP2, VP3, VP4}, VPS2={VP5, VP6, VP7, VP8}, VPS3 defined as {VP9, VP10, VP11, VP12} and the virtual paths defined as VPR={VP13, VP14, VP15, VP16}. Alternatively, VP addresses could have been assigned round-robin, with 1, 5, 9, and 13 assigned to VPS1; 2, 6, 10 and 14 assigned to VPS2; 3, 7, 11, and 15 assigned to VPS3; and 4, 8, 12 and 16 held in reserve. Alternatively, more or fewer addresses could be held in reserve, and/or a different number of virtual path addresses could be assigned to each route (e.g., 1 VP each for of the routes from N0 to N1 and N0 to N2, 9 VPs for the route from N0 to N3, and 5 VPs held in reserve). In an actual PNNI application, the full VP address space could be partitioned, or a subset of addresses allocated to the local ring could be used. However, in any of the prior cases, if additional VP assignments are required during operation of the ring, then a mechanism based on the '947 application can be employed to adjust VP assignment density to any given node.

Figure 5:
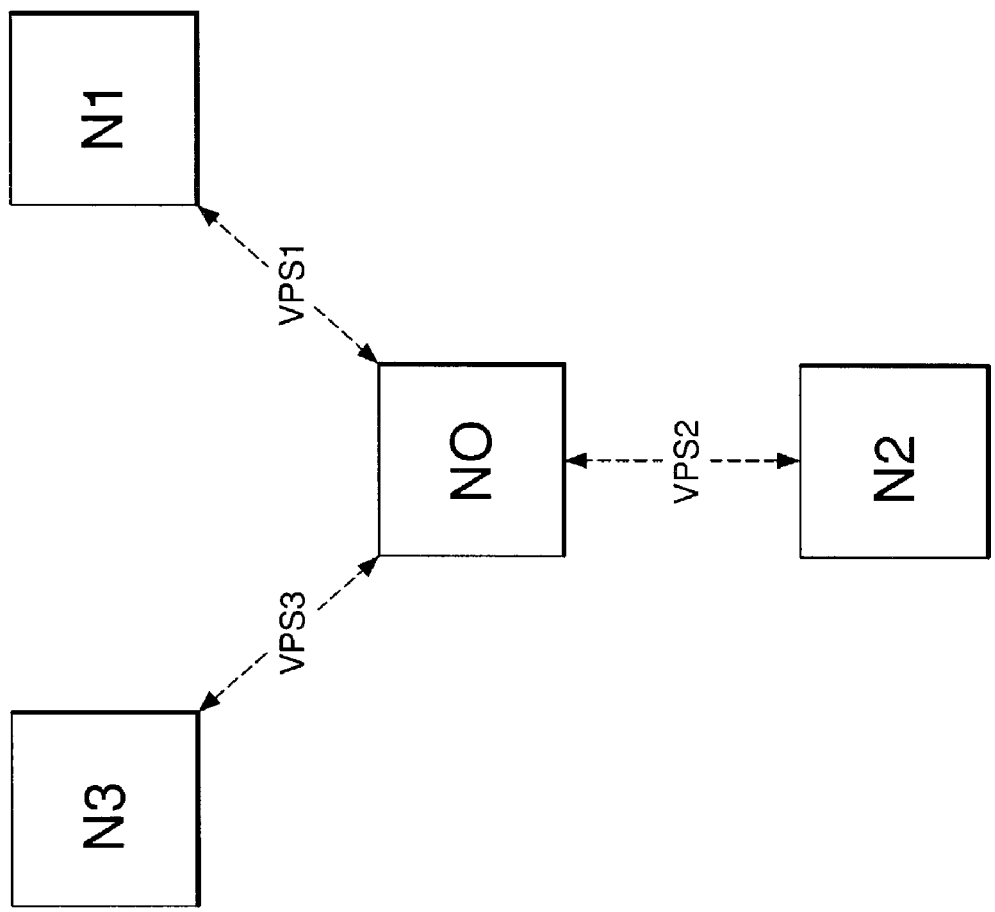
FIG. 5 depicts the logical star topology of the network of FIG. 4.

The resulting logical star architecture depicted in FIG. 5 provides distinct advantages over the underlying ring depicted in FIG. 2 in such areas as control channel processing, protection switching, dynamic administration, bandwidth management, automatic provisioning, and Switched Virtual Circuit (SVC) signaling. In FIG. 5, N0 represents the head node attached to the network feeder (not illustrated), and only the virtual paths between the head node and the other nodes in the network are illustrated (dotted lines).

As can be seen from FIG. 5, all nodes are at most two logical hops distant from each other. In a generic n-node ring, nodes can be as far as n/2 hops away from each other. When signaling between nodes on the ring, the logical star overlay of this invention provides a distinct advantage since all intermediate nodes are relieved of the burden of control channel processing. The larger the ring, the greater this advantage becomes.

Protection

Additionally, even though the logical architecture is a star, the protection advantages of the underlying ring are preserved. This allows the use of existing star-oriented software in the ring environment. Protection switching at the VP layer will be automatically recovered by this architecture, as the PTSE flood resulting from a node or link failure will support re-administration of the logical star imposed on the ring by virtue of retriggering the Administer Ring routine. There are many protection mechanisms that may be implemented by the underlying network. These include 1+1 protection, span protection, 1:1 protection, and shared protection. These schemes are described in detail in Al-Salameh, D. Y., Korotky, S. K., Levy, D. S., et al., *Optical Fiber Telecommunication—Volume IVA*, Elsevier Science, USA, Ch. 7, pp. 318-327, incorporated herein by reference. Additional shared optical protection schemes denoted 1:N are discussed in detail in U.S. patent application Ser. No. 09/675,733 filed on Sep. 30, 2000 as attorney docket no. Al-Salameh, D. Y., 10-1-2-5-35, also incorporated herein by reference. Additional applicable mechanisms include bidirectional path switched rings (BPSR), unidirectional line switched rings (ULSR), and related mechanisms discussed in the literature generically as "path switched rings." Because the logical star topology is overlaid on the underlying protected network, any of the previously mentioned schemes will afford protection to the logical star overlay network as well.

The head node can effectively manage the network feeder utilization. By centralizing this function, resources such as bandwidth can be more effectively managed. Note that the head node, which is typically the node connected to the network feeder, is usually protected from failure via the use of redundant hardware and software shadowing techniques. However, if the head node fails, the PGLE process defined by PNNI will automatically be invoked to elect a new PGL. Each potential PGL in a network can be running a PGL-detect routine per this invention whereby, once a node gets elected PGL, the detect routine detects this appointment and invokes the Administer Ring routine and related software necessary to support the logical star overlay per this invention. As mentioned previously, methods such as those discussed in the '947 application can be used to assist in system initialization and run-time optimization, which will more fully automate the provisioning of the ring.

SVC signaling can be handled in a straightforward manner by establishing a convention (via ILMI) that correlates the signaling channels between the head node and the other nodes by using the initialization time partition values as logical offsets in the VP space.

Ring Abstractions

FIG. 2 depicts a ring topology upon which one embodiment of this invention may be based. FIG. 2 may represent either a physical ring or a "ring-abstraction" of an underlying network that may be a ring or other topology. This underlying network may itself be an abstraction of yet another underlying network of ring or other topology. In practice, there is no theoretical limit to the number of abstractions that can be layered upon a core network before the logical star overlay of the invention is applied. In practice, however, depending on implementation, each additional layer of abstraction may add additional overhead in the administration of the overlay.

Even though, in typical applications, the underlying core network is a physical network, it is not essential that this be the case. In some applications, the core network can be purely software. One such application is simulation of the operation of the abstraction and overlay process on a computer before implementation in the field or in a product. Additionally, although it is desirable for the underlying network to present the abstraction of a "protected" ring, protection is not necessary for all embodiments of this invention.

Figure 6:
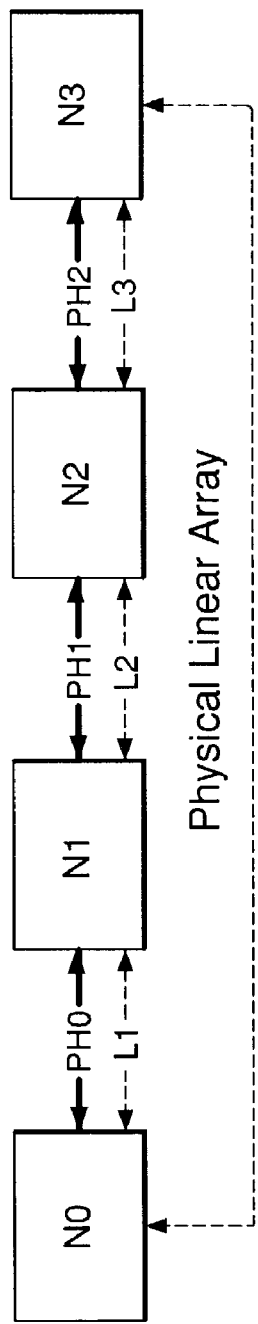
FIG. 6 depicts an exemplary non-star, non-ring network overlaid with a logical ring topology according to one embodiment of this invention.
Figure 7:
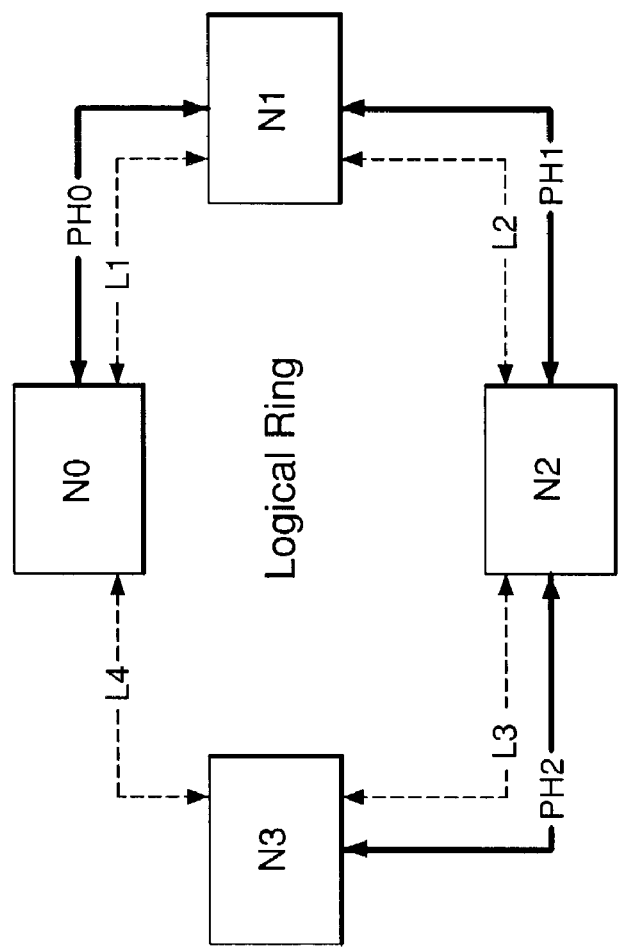
FIG. 7 depicts the logical ring topology of the network of FIG. 6.

For example, in one embodiment, FIG. 2 could represent a linear physical array abstracted as a logical ring such as the linear array depicted in FIGS. 6 and 7. FIG. 6 highlights the physical linear array topology of the network, while FIG. 7 highlights the logical ring topology of the ring abstraction of the linear network. In both cases, the solid lines represent physical paths between nodes, and the dotted lines represent logical paths between nodes. A set of logical paths including a logical connection between the two ends of the linear array (i.e., logical path L4 between nodes N0 and N3) results in a ring abstraction of the linear physical array.

One implementation of the ring abstraction for the linear network of FIGS. 6 and 7 includes the following mappings. Traffic logically carried on logical path L1 in the abstraction is physically carried on physical path PH0. Traffic logically carried on L2 in the abstraction is physically carried on PH1. Traffic logically carried on L3 in the abstraction is physically carried on PH2. Finally, the traffic logically carried on L4 in the abstraction is physically carried on a combination of PH0, PH1, and PH2.

Figure 8:
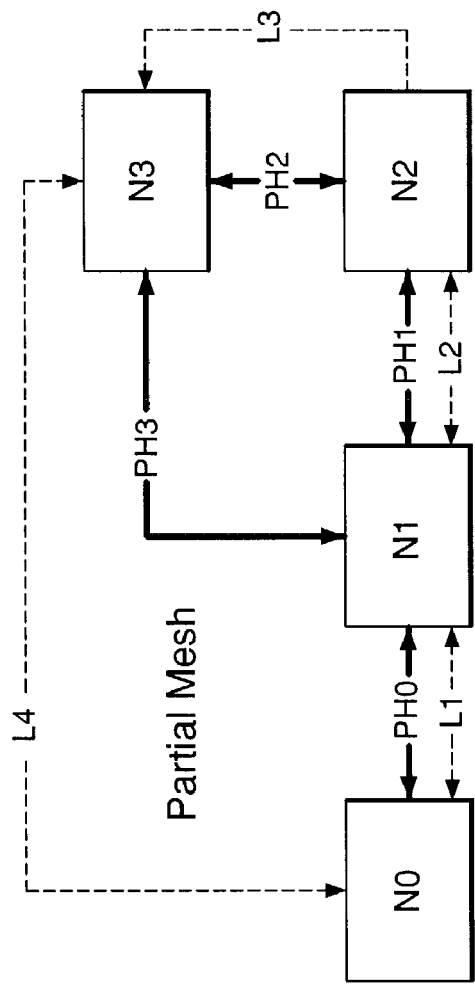
FIG. 8 depicts another non-star, non-ring network overlaid with a logical ring topology according to one embodiment of this invention.
Figure 9:
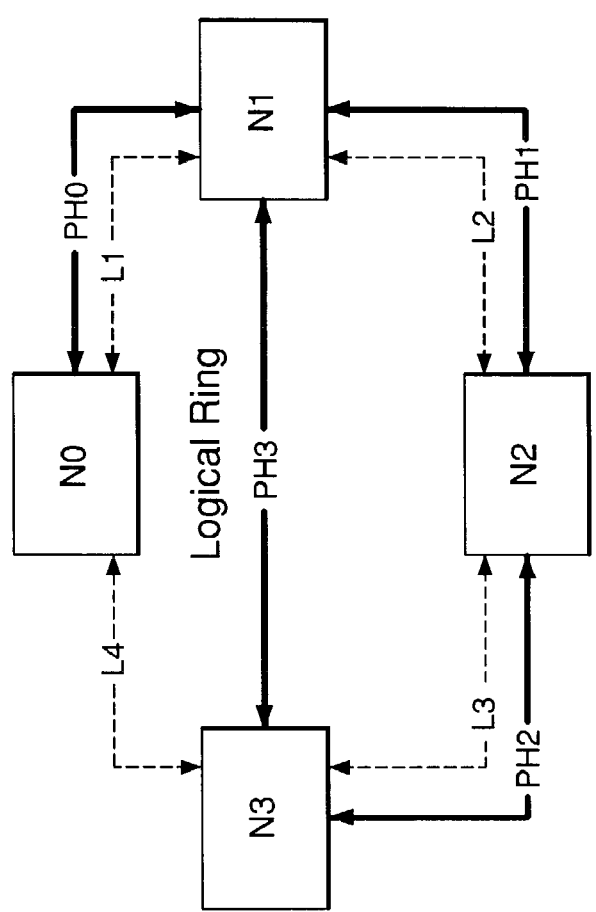
FIG. 9 depicts the logical ring topology of the network of FIG. 8.

In yet another possible embodiment, FIG. 2 could represent a partial mesh array abstracted as a logical ring such as the array depicted in FIGS. 8 and 9. FIG. 8 highlights the physical mesh topology of the network, while FIG. 9 highlights the logical ring topology of the ring-abstraction of the mesh network. In both cases, the solid lines represent physical paths between nodes, and the dotted lines represent logical paths between nodes.

One implementation of the ring abstraction for the mesh network of FIGS. 8 and 9 includes the following mappings. Traffic logically carried on logical path L1 in the abstraction is physically carried on physical path PH0. Traffic logically carried on L2 in the abstraction is physically carried on PH1. Traffic logically carried on L3 in the abstraction is physically carried on PH2. Finally, traffic logically carried on L4 in the abstraction is physically carried on the combination of PH0, PH1, and PH2.

In alternative implementations, one or more of the following mappings may apply to logical paths L2, L3, and/or L4. Traffic logically carried on L2 in an abstraction may be physically carried on the combination of PH2 and PH3. Traffic logically carried on L3 in an abstraction may be physically carried on the combination of PH1 and PH3. And, lastly, traffic logically carried on L4 in an abstraction may be physically carried on the combination of PH0 and PH3.

In other possible embodiments, FIG. 2 could represent a ring interconnect of logical group nodes in a Private Network-Network Interface (PNNI) routing hierarchy including a partial peer group of logical group nodes and a peer group of logical group nodes. The concepts of peer groups and logical group nodes are described in more detail in "Private Network-Network Interface Specification Version 1.0," (PNNI 1.0), af-pnni-0055.000, ATM Forum, March 1996, incorporated herein by reference in its entirety.

Protected Rings

Figure 10:
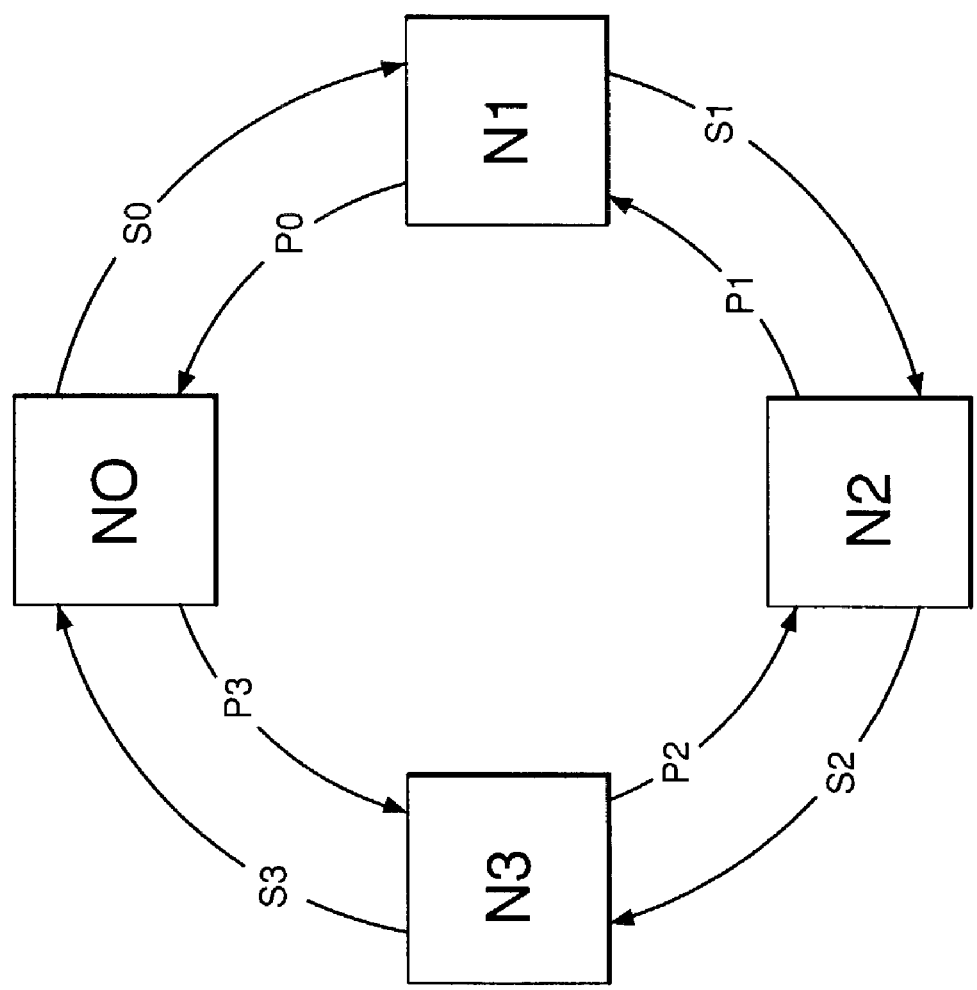
FIG. 10 depicts an exemplary bidirectional protected ring network.

Ring topologies are especially suitable for protection schemes, for example 1+1, where all service paths are defined as being in one direction (e.g., clockwise around the ring) and all protection paths are defined as being in the opposite direction (e.g., counter-clockwise). If communications on the ring are disrupted (e.g., by a node or link failure), then all traffic previously serviced by the failed node or link will be routed in the opposite direction. FIG. 10 shows a ring topology with four nodes N0, N1, N2, and N3. These four nodes are serially connected in the clockwise direction by service paths S0, S1, S2, and S3. These service paths allow the flow of information along them between interconnected nodes. For example, S0 supports information flow from N0 to N1, S1 supports information flow from N1 to N2, and so on. The nodes are also serially connected in the counter-clockwise direction by protection paths P0, P1, P2, and P3. Protection paths normally carry only a keep-alive signal for maintaining the path. However, the protection path is also capable of carrying information between nodes. For example, P3 supports information flow from N0 to N3, P2 supports information flow from N3 to N2, P1 supports information flow from N2 to N1, and P0 supports information flow from N1 to N0.

In accordance with general ring protection techniques, if any one of the service paths is disabled by a failure or degradation of that link (e.g., cut path, degraded transmitter, etc.), then the service traffic associated with that service path is redirected along one or more protection paths in the opposite direction around the ring. For example, if service path S1 fails, then the traffic associated with a connection from node N0 to node N2 will be routed along protection paths P3 and P2, instead of service paths S0 and S1.

In the absence of any service path failures, the distance in hops from N0 to N1 is one hop, from N0 to N2 is two hops, and from N0 to N3 is three hops. In general, for an n-node ring, the distance from one node to any other node can be as large as n−1 hops.

Routing

As information reaches each node, it is examined by the local routing intelligence of the node (not illustrated) to determine whether the information has reached its final destination, or, if it has not, how it is to be routed to its final destination. Many different routing protocols exist. Some of the more common include link-state routing protocols such as Open Shortest Path First (OSPF) and distance-vector routing protocols such as "Hello" and "RIP." Common to these protocols is a cost (i.e., memory or compute resources) per node (i.e., per hop) for examining the addressing information on received information, modifying headers as necessary, and routing along to the next hop or node.

Virtual Paths

The cost of communication can be reduced in networks of the type illustrated by FIG. 10 through the use of a "virtual path." Creating a virtual path through a network amounts to predefining a route through the network in advance of a communication. Intermediate nodes on the route effectively ignore communication packets associated with a virtual path that they do not terminate. A communication packet associated with a virtual path is thus not subject to the full overhead or routing cost at each intermediate node along the journey to its destination.

For example, in the network of FIG. 10, a virtual path VPi could be created from N0 to N3 by informing nodes in the network that this path exists and that packets associated with this path are not to be routed, only passed along if the node does not terminate the virtual path. A communication packet associated with VPi would start on its journey from N0 along S0. It would be ignored (i.e., passed along) by N1, continue on its journey along S1 to N2 where it would be ignored (i.e., passed along) by N2, and continue to N3 over S2 where it would finally be picked out of the stream and passed along to a destination client local to N3. A virtual path such as this could be set up for every possible source and destination combination on the four-node ring of FIG. 10. This is illustrated by TABLE 1 where virtual path VP1 connects N0 to N1, VP2 connects N0 to N2, VP3 connects N0 to N3, VP4 connects N1 to N2, VP5 connects N1 to N3, VP6 connects N2 to N3, VP7 connects N1 to N0, VP8 connects N2 to N0, VP9 connects N2 to N1, VP10 connects N3 to N0, VP11 connects N3 to N1, and VP12 connects N3 to N2. For large rings, the administration and system resource usage can become significant since the virtual path address usage is $(n^2-n)$ for an n-node ring.

TABLE 1

|  | Virtual Path | End Node | | | |
|---|---|---|---|---|---|
|  |  | N0 | N1 | N2 | N3 |
| Start Node | N0 | N/A | VP1 | VP2 | VP3 |
|  | N1 | VP7 | N/A | VP4 | VP5 |
|  | N2 | VP8 | VP9 | N/A | VP6 |
|  | N3 | VP10 | VP11 | VP12 | N/A |

As discussed previously, FIG. 10 may represent a physical ring communications network. For example, FIG. 10 could represent a Synchronous Optical NETwork (SONET) ring as used in an access, metropolitan, long-haul, or other network application. FIG. 10 may alternatively represent any communication structure, be it physical or virtual, that presents an abstraction of the underlying network in the form of a logical ring. For example, it could represent an ATM Virtual Path Ring (VPR).

In any of the preceding cases, the resulting network appears to the layer above the ring-abstraction as if it were a simple ring network, similar in nature to the ring of FIG. 10.

Logical Star Overlay on Protected Ring

Figure 11:
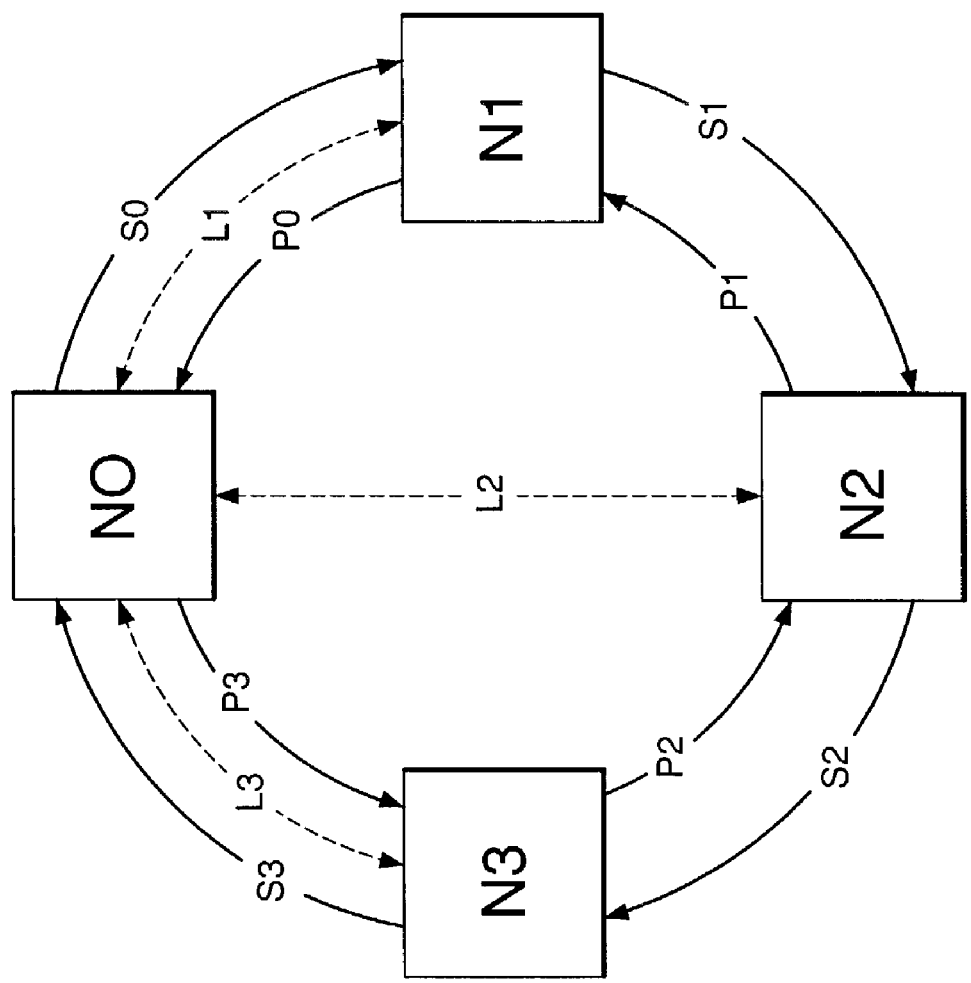
FIG. 11 depicts a logical star topology overlaid on the network of FIG. 10 according to one embodiment of the invention.

One embodiment of this invention exemplified by FIG. 11 strikes a compromise between the cost of routing packets at each node and the cost of administering $(n^2-n)$ virtual or logical paths for an n-node ring. In particular, FIG. 11 depicts the ring topology of FIG. 10 overlaid with virtual bidirectional paths L1, L2, and L3 according to one embodiment of this invention. The logical paths constitute a logical star topology effectively overlaid on the underlying ring topology. The paths are illustrated in TABLE 2. Note that the paths represent a subset of the virtual paths of the fully administered ring listed in TABLE 1. The logical paths L1, L2, and L3 support information flow between their respective interconnected nodes. For example, L1 supports information flow between N0 and N1; L2 supports information flow between N0 and N2; and L3 supports information flow between N0 and N3. For the protected ring of FIG. 10, service traffic logically carried on L1 of the star overlay from N0 to N1 is carried on path S0 of the underlying ring topology, while service traffic logically carried on L1 of the star overlay from N1 to N0 is carried on the combination of service paths S1, S2, and S3 of the underlying ring topology.

TABLE 2

|  | Virtual Path | End Node | | | |
|---|---|---|---|---|---|
|  |  | N0 | N1 | N2 | N3 |
| Start Node | N0 | N/A | L1 | L2 | L3 |
|  | N1 | L1 | N/A | L1, L2 | L1, L3 |
|  | N2 | L2 | L2, L1 | N/A | L2, L3 |
|  | N3 | L3 | L3, L1 | L3, L2 | N/A |

Similarly, service traffic logically carried on L2 of the star overlay from N0 to N2 is carried on the combination of S0 and S1 of the underlying ring topology, while service traffic logically carried on L2 of the star overlay from N2 to N0 is carried on the combination of S2 and S3 of the underlying ring topology.

Lastly, service traffic logically carried on L3 in the star overlay from N0 to N3 is carried on the combination of S0, S1, and S2 of the underlying ring topology, while service traffic logically carried on L3 in the star overlay is from N3 to N0 is carried on S3 of the underlying ring topology.

The mapping between logical paths and physical paths for this overlay are listed in TABLE 3 below where commas are used to separate elements of a collection of physical links corresponding to one logical path and a semicolon is used to separate collections.

Note that, in certain circumstances, the physical path traversed by a communication (given the logical star overlay imposed on the network) is blatantly less than ideal. For example, service traffic between nodes N1 and N2 will be logically carried on logical paths L1 and L2 via intermediate node N0. Thus, as documented in TABLE 3, this traffic will physically traverse S1, S2, and S3 corresponding to L1, followed by S0 and S1 corresponding to L2. This, of course, is clearly not the most efficient physical path for such a communication but it represents the compromise between the cost of full administration of the ring and the benefits of the star overlay. These benefits become more manifest as the number of nodes increases.

TABLE 3

|  | Physical Path | End Node | | | |
|---|---|---|---|---|---|
|  |  | N0 | N1 | N2 | N3 |
| Start Node | N0 | N/A | S0 | S0, S1 | S0, S1, S2 |
|  | N1 | S1, S2, S3 | N/A | S1, S2, S3; S0, S1 | S1, S2, S3; S0, S2, S2 |
|  | N2 | S2, S3 | S2, S3; S0 | N/A | S2, S3; S0, S1, S2 |
|  | N3 | S3 | S3; S0 | S3; S0, S1 | N/A |

Similarly, service traffic between nodes N1 and N3 will be logically carried on logical paths L1 and L3 via intermediate node N0 and will physically traverse S1, S2, S3; S0, S1, S2. And service traffic between nodes N2 and N3 will be logically carried on logical paths L2 and L3 via intermediate node N0 and will physically traverse S2, S3; S0, S1, S2. As a final example, service traffic from node N1 to node N2 is physically carried on the combination of paths S1, S2, and S3 (corresponding to service traffic from N1 to N0 over L1), followed by the combination of paths S0 and S1 (corresponding to service traffic from N0 to N2 over L2). Other examples are depicted in TABLE 3 where it can be seen that node N0 is either a terminal node or an intermediate node for all possible network connections.

It is important to remember that the cost of traversing each physical node in a multiple physical node traversal has been significantly decreased by virtue of the virtual path assignments imposed on the network. For example, in an ATM context, once the ATM line manager and ATM buffer manager functions have been set up with the appropriate VPI/VCI settings, each node can forward packets with typically only a few hardware operations and no local node processor involvement. In the logical star overlay network of FIG. 11, a communication packet from N0 to N3 must still pass through nodes N1 and N2. However, unlike such a communication in the underlying ring network, minimal cost is associated with the passage.

This is because one aspect of the logical star overlay process is to instruct nodes to forward (i.e., map VPI/VCI according to preconfigured rules in the ATM line management function) any traffic that is labeled with a logical path that does not terminate at that node. Nodes implementing the overlay instructions can, with minimal cost, determine that an information packet does not belong to a path terminated by that node by examining its header (e.g., VPI/VCI fields). However, without these overlay instructions, packets would have to be reassembled into higher-layer protocol data units and addresses with routing information compared and updated at each intermediate node along a route. Then, routing addresses and virtual circuit addresses would have to be updated and packets again segmented for transmission before being sent on to the next hop.

Note that, in the logical star overlay network of FIG. 11, the distance between N0 and N1 is one logical hop (corresponding to logical path L1), between N0 and N2 is one logical hop (corresponding to logical path L2), and between N0 and N3 is one logical hop (corresponding to logical path L3). Meanwhile, the distance between N1 and N2 is two logical hops (corresponding to logical paths L1 and L2), between N1 and N3 is two logical hops (corresponding to logical paths L1 and L3), and between N2 and N3 is two logical hops (corresponding to logical paths L2 and L3). In general, for any n-node logical star overlay, the distance between any two nodes in the network is at most two logical hops. This is significantly less than the maximum distance of (n−1) hops in an n-node ring. Additionally, the total number of virtual or logical paths required to support the logical star overlay for the four-node ring network of FIG. 11 is only three. In general, for an n-node network, the number of logical or virtual paths required to implement the logical star topology is only (n−1). This is also significantly less than the (n²−n) virtual paths required for an n-node ring.

In the event of a failure of a physical link, affected service traffic will be rerouted in the underlying ring to utilize one or more of the protection paths P0, P1, P2, and P3. For example, if the physical link between nodes N0 and N1 fails, then service traffic logically carried on logical path L1 from N0 to N1 will be re-routed to the combination of protection paths P3, P2, and P1, and service traffic logically carried on L1 from N1 to N0 over S1, S2, and S3 will continue to follow that route. Similarly, other physical routes will change corresponding to this and other failures and can be derived by extension of the previous methods. Such rerouting is advantageously handled by the protection mechanism of the underlying ring, where the logical star overlay inherits the protection aspects of the underlying abstracted network, while still exhibiting the star topology advantages.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for routing signals in a non-star network having a plurality of nodes connected in a non-star topology, comprising:
   overlaying a logical star topology on the non-star network; and
   routing the signals in the non-star network according to the logical star topology, wherein the logical star topology comprises at least one virtual path having two terminal nodes and at least one intermediate node of the non-star network, such that, when signals are routed between the two terminal nodes via the at least one virtual path, overhead processing at the at least one intermediate node is less than overhead processing at the start node of the at least one virtual path.

2. The invention of claim 1, wherein:
   the non-star network has a physical ring topology; and
   the logical star topology is directly overlaid on the physical ring topology.

3. The invention of claim 1, wherein:
   the non-star network has a physical non-ring topology; and
   a logical ring topology is overlaid on the physical non-ring topology; and
   the logical star topology is overlaid on the logical ring topology.

4. The invention of claim 1, wherein:
   the non-star network conforms to a specification that defines a peer group leader for each group of one or more nodes in the non-star network; and
   the non-star network is adapted to designate at least one peer group leader as a head node in the logical star topology.

5. The invention of claim 4, wherein a virtual path is assigned from the head node in the logical star topology to each other node in the logical star topology.

6. The invention of claim 4, wherein, when a node is added to or removed from the non-star network, the non-star network automatically adjusts the assignment of virtual paths in the logical star topology.

7. A non-star network having a plurality of nodes connected in a non-star topology, wherein:
   the non-star network is adapted to route signals in the network according to a logical star topology that is overlaid on the non-star network; and
   the logical star topology comprises at least one virtual path having two terminal nodes and at least one intermediate node of the non-star network, such that, when signals are routed between the two terminal nodes via the at least one virtual path, overhead processing at the at least one intermediate node is less than overhead processing at the start node of the at least one virtual path.

8. The invention of claim 7, wherein:
   the non-star network has a physical ring topology; and
   the logical star topology is directly overlaid on the physical ring topology.

9. The invention of claim 7, wherein:
   the non-star network has a physical non-ring topology; and
   a logical ring topology is overlaid on the physical non-ring topology; and
   the logical star topology is overlaid on the logical ring topology.

10. The invention of claim 7, wherein:
the non-star network conforms to a specification that defines a peer group leader for each group of one or more nodes in the non-star network; and
the non-star network is adapted to designate at least one peer group leader as a head node in the logical star topology.

11. The invention of claim 10, wherein a virtual path is assigned from the head node in the logical star topology to each other node in the logical star topology.

12. The invention of claim 10, wherein, when a node is added to or removed from the non-star network, the non-star network is adapted to automatically adjust the assignment of virtual paths in the logical star topology.

13. A method for routing signals in a non-star network having a plurality of nodes connected in a non-star topology, comprising:
overlaying a logical star topology on the non-star network; and
routing the signals in the non-star network according to the logical star topology, wherein:
the non-star network conforms to a specification that defines a peer group leader for each group of one or more nodes in the non-star network; and
the non-star network is adapted to designate at least one peer group leader as a head node in the logical star topology.

14. The invention of claim 13, wherein a virtual path is assigned from the head node in the logical star topology to each other node in the logical star topology.

15. The invention of claim 13, wherein, when a node is added to or removed from the non-star network, the non-star network automatically adjusts the assignment of virtual paths in the logical star topology.

16. A non-star network having a plurality of nodes connected in a non-star topology, wherein:
the non-star network is adapted to route signals in the network according to a logical star topology that is overlaid on the non-star network;
the non-star network conforms to a specification that defines a peer group leader for each group of one or more nodes in the non-star network; and
the non-star network is adapted to designate at least one peer group leader as a head node in the logical star topology.

17. The invention of claim 16, wherein a virtual path is assigned from the head node in the logical star topology to each other node in the logical star topology.

18. The invention of claim 16, wherein, when a node is added to or removed from the non-star network, the non-star network is adapted to automatically adjust the assignment of virtual paths in the logical star topology.

19. A method for routing signals in a non-star network having a plurality of nodes connected in a non-star topology, comprising:
overlaying a logical star topology on the non-star network; and
routing the signals in the non-star network according to the logical star topology, wherein:
the non-star network has a physical non-ring topology;
a logical ring topology is overlaid on the physical non-ring topology; and
the logical star topology is overlaid on the logical ring topology.

20. A non-star network having a plurality of nodes connected in a non-star topology, wherein:
the non-star network is adapted to route signals in the network according to a logical star topology that is overlaid on the non-star network;
the non-star network has a physical non-ring topology;
a logical ring topology is overlaid on the physical non-ring topology; and
the logical star topology is overlaid on the logical ring topology.

* * * * *